United States Patent
Bass et al.

(10) Patent No.: US 7,526,491 B2
(45) Date of Patent: Apr. 28, 2009

(54) SYSTEM AND METHOD FOR CREATING AND USING TEMPORARY DATA STORAGE IN AN XFORMS APPLICATION

(75) Inventors: Joshua D. Bass, Carlsbad, CA (US); Stephen M. Breitenbach, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 464 days.

(21) Appl. No.: 10/899,573

(22) Filed: Jul. 27, 2004

(65) Prior Publication Data

US 2005/0086581 A1  Apr. 21, 2005

Related U.S. Application Data

(60) Provisional application No. 60/511,220, filed on Oct. 15, 2003.

(51) Int. Cl.
*G06F 17/30* (2006.01)
(52) U.S. Cl. .............. 707/100; 707/101; 707/102; 707/10; 707/3
(58) Field of Classification Search ............ 707/100, 707/102; 715/505, 513, 523
See application file for complete search history.

(56) References Cited

U.S. PATENT DOCUMENTS

| | | | |
|---|---|---|---|
| 6,209,124 B1* | 3/2001 | Vermeire et al. | 717/114 |
| 6,418,446 B1* | 7/2002 | Lection et al. | 707/103 R |
| 7,051,042 B2* | 5/2006 | Krishnaprasad et al. | 707/102 |
| 7,194,682 B2* | 3/2007 | Warrington | 715/517 |
| 2003/0158854 A1* | 8/2003 | Yoshida et al. | 707/101 |
| 2004/0003341 A1* | 1/2004 | alSafadi et al. | 715/500 |
| 2004/0111673 A1* | 6/2004 | Bowman et al. | 715/513 |
| 2004/0205731 A1* | 10/2004 | Junkermann | 717/136 |
| 2006/0129921 A1* | 6/2006 | Relyea et al. | 715/524 |

* cited by examiner

*Primary Examiner*—Cam Y Truong
(74) *Attorney, Agent, or Firm*—Park, Vaughan & Fleming, LLP

(57) ABSTRACT

A system and method for enabling the use of temporary data in an XForms application without requiring the data to be included in the application's instance data. An XForms author includes an extension element in an XForms markup document. The extension element describes element and attributes of desired temporary instance data. The temporary data can be read and written as normal XForms instance data. The temporary data may or may not be serialized, depending on whether exposure to an external data consumer is or is not desired.

17 Claims, 8 Drawing Sheets

```xml
<?xml version="1.0" ?>
<html   xmlns=http://www.w3.org/1999/xhtml"
        xmlns:ev="http://www.w3.org/2001/xml-events"
        xmlns:xforms="http://www.w3.org/2002/xforms"
        xmlns:temp="http://www.oracle.com/2003/XClient/TemporaryVariable">
  <head>
    <xforms:model id="mdMain">
      <xforms:extension>
        <temp:annotate nodeset="/expense">
          <temp:addAttribute name="display">summary_view</temp:addAttribute>
          <temp:addAttribute name="detail_view"/>
          <temp:addAttribute name="summary_view"/>
        </temp:annotate>
      </xforms:extension>
      <xforms:bind nodeset="/expense/@temp:summary_view" relevant= "../
@temp:display='summary_view'"/>
      <xforms:bind nodeset="/expense/@temp:detail_view" relevant= "../
@temp:display='detail_view'"/>
      <xforms:bind nodeset="expense/receipt/shortDescription" relevant= "../expense/
@temp:display='summary_view'"/>
      <xforms:bind nodeset="expense/receipt/longDescription" relevant= "../expense/
@temp:display='detail_view'"/>
      <xforms:instance src="expenseData.xml"/>
    </xforms:model>
  </head>

<body>
        <!-- Display expense receipt data -->
    <xforms:repeat nodeset="/expense/receipt">
      <xforms:output ref="@ID"/>
      <xforms:output ref="receiptAmount"/>
      <span>
        <xforms:group ref="shortDescription"/>
          <span>
          <xforms:output ref="." />
          </span>
        </xforms group>
        <xforms:group ref="longDescription"/>
          <span>
          <xforms:output ref="." />
          </span>
        </xforms:group>
      </span>
    </xforms:repeat>
      .
      .
      .
```

XForms Model Document 602

FIG. 6A

```xml
<!-- Display appropriate Show/Hide button -->
<xforms:group ref="/expense/@temp:summary_view">
  <xforms:trigger>
    <xforms:label>Detail View</xforms:label>
    <xforms:action ev:event="DOMActivate">
      <xforms:setvalue ref="/expense/@temp:display">detail_view</xforms:setvalue>
    </xforms:action>
  </xforms:trigger>
</xforms:group>
<xforms:group ref="/expense/@temp:detail_view">
  <xforms:trigger>
    <xforms:label>Summary View</xforms:label>
    <xforms:action ev:event="DOMActivate">
      <xforms:setValue ref="/expense/@temp:display">summary_view</xforms:setvalue>
    </xforms:action>
  </xforms:trigger>
</xforms:group>
</body>
</html>
```

XForms Model Document 602
(continued)

FIG. 6B

```xml
<expense xmlns="">
  <receipt id="1">
    <receiptAmount>$7.25</receiptAmount>
    <shortDescription>Taxi</shortDescription>
    <longDescription>Taxi from airport to customer headquarters, 4.5 miles.
    </longDescription>
  </receipt>
  <receipt id="2">
    <receiptAmount>$35.00</receiptAmount>
    <shortDescription>Dinner</shortDescription>
    <longDescription>Dinner with customer at Bob's steakhouse.
    </longDescription>
  </receipt>
  <receipt id="3">
    <receiptAmount>$125.00</receiptAmount>
    <shortDescription>Hotel</shortDescription>
    <longDescription>Hyatt Regency Hotel, Del Mar California. Single room, one night.
    </longDescription>
  </receipt>
  <receipt id="4">
    <receiptAmount>$12.50</receiptAmount>
    <shortDescription>Taxi</shortDescription>
    <longDescription>Taxi from Hyatt Regency hotel to airport, 8 miles.
    </longDescription>
  </receipt>
</expense>
```

Instance Data Document 702

FIG. 7

SYSTEM AND METHOD FOR CREATING AND USING TEMPORARY DATA STORAGE IN AN XFORMS APPLICATION

RELATED APPLICATION

This application claims priority to U.S. Provisional Application Ser. No. 60/511,220, filed on Oct. 15, 2003, which is hereby incorporated by reference.

BACKGROUND

This invention relates generally to the field of computer programming. More particularly, a system and method are provided for facilitating the use of temporary data storage within an XForms application.

There are many languages and interfaces designed to help one define, generate and/or present a web form or other document accessed and manipulated via a web browser. Some of the markup language options include HTML (HyperText Markup Language), XHTML (eXtensible HyperText Markup Language), WML (Wireless Markup Language) and HDML (Handheld Device Markup Language). However, these markup languages compel an author to merge the functional and presentation aspects of a form.

XForms, developed by the World Wide Web Consortium (W3C), is a specification for a forms markup language that uses a layered approach to allow the presentation of a form to be separated from its content. More particularly, XForms treats a web form as a composition of three layers: data, logic and presentation. The data layer identifies data fields in the form. The logic layer identifies constraints and dependencies on or between data fields. The presentation layer defines what the form looks like when it is output on a printer or computer screen. XForms documents can be viewed using a web browser or other application interface on virtually any type of computing device, including personal digital assistants and mobile telephones.

Because the XForms architecture is intended to provide a medium for a structured interchange of data, the collection or definition of an XForms document is important. Data used in a document are typically referred to as the document's "instance data," and may be represented using an XML (eXtensible Markup Language) schema. Data are fed to an XForms processor, which applies the document's logic and presentation interface.

XForms instance data may be generated by a third party, and may reside internal or external to a particular XForms document or page. At runtime, an XForms document consumes specified instance data, and can modify the data and submit the modified data to an external consumer.

However, the XForms 1.0 specification allows XForms documents to manipulate the content, but not the structure, of instance data. For example, an XForms document can clone or modify XML elements and attributes included in the document's instance data. An XForms document author wishing to use temporary data storage (e.g., for application state management only within the context of the XForms application), would have to ensure that the storage was provided for in the document's instance data. But this may be difficult.

For example, if the instance data is provided by a third party, that third party may know nothing about the specific user interface and/or data management requirements of the document. Or, the third party may be unwilling to provide temporary data storage requested by one customer, if the data are provided to multiple customers. Yet further, an XML schema may constrain the data in a manner that would disallow the one customer's attributes.

In addition, temporary data storage that is included in the document's instance data and therefore serialized, would be exposed to any external consumer of the instance data. This may be undesirable in some cases.

SUMMARY

A system and method are provided for facilitating the use of temporary data storage in an XForms document or application, wherein the temporary data need not be defined in the document's instance data.

In one embodiment of the invention, an XForms extension element is introduced to allow an XForms document author to declare new temporary instance data elements and attributes inside an XForms document. In this embodiment, an extension element is embedded within an XForms document, and describes element names and attributes of the desired temporary instance data. The temporary data can be read and written as normal XForms instance data.

Thus, an XForms instance data provider, which may be separate from the development team of an XForms application that will consume the data, need not provide temporary instance variables for the application.

Further, an application may selectively serialize temporary data, depending on whether exposure to external data consumers is desired. In particular, annotation nodes may be configured to specify whether they are serialized, by using Boolean XPath expressions for example.

DESCRIPTION OF THE FIGURES

FIGS. 6A and 6B demonstrates an embodiment of the invention implemented to facilitate relevance toggling, according to one embodiment of the invention.

FIG. 7 presents a sample instance data document for use with the embodiment of the invention depicted in FIGS. 6A and 6B.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, an XForms extension element is introduced to allow an XForms author to declare new temporary instance data elements and attributes inside an XForms document. Thus, unlike the existing XForms repeat construct, annotation instance data nodes can be inserted at runtime, without existing prototype nodesets.

An implementation of this embodiment of the invention enhances the XForms repeat structure by cloning annotation instance elements under a repeat set. The present XForms specification offers no means of creating arbitrary instance data nodes that can be cloned in such a fashion.

The extension element introduced in this embodiment provides a declarative structure for inserting element and attribute nodes into XForms instance data at runtime. For example, a collection of XML elements in a specified namespace may be enclosed within the standard XForms <extension> element.

Thus, in this embodiment, temporary data storage may be inserted into an XForms application at the model layer, without requiring the provider of instance data to include the storage in the application instance's data. This may be particularly useful if the instance data are provided by a source other than the developer of the application.

And, because the temporary data storage is not provided as part of the instance data, it need not be serialized. For example, classes of annotation instance data nodes can be selectively serialized. Unwanted exposure of the temporary data to external consumers can therefore be avoided. Standard XForms, in contrast, only allows filtering of serialized data through XPath expressions.

Figure 1:
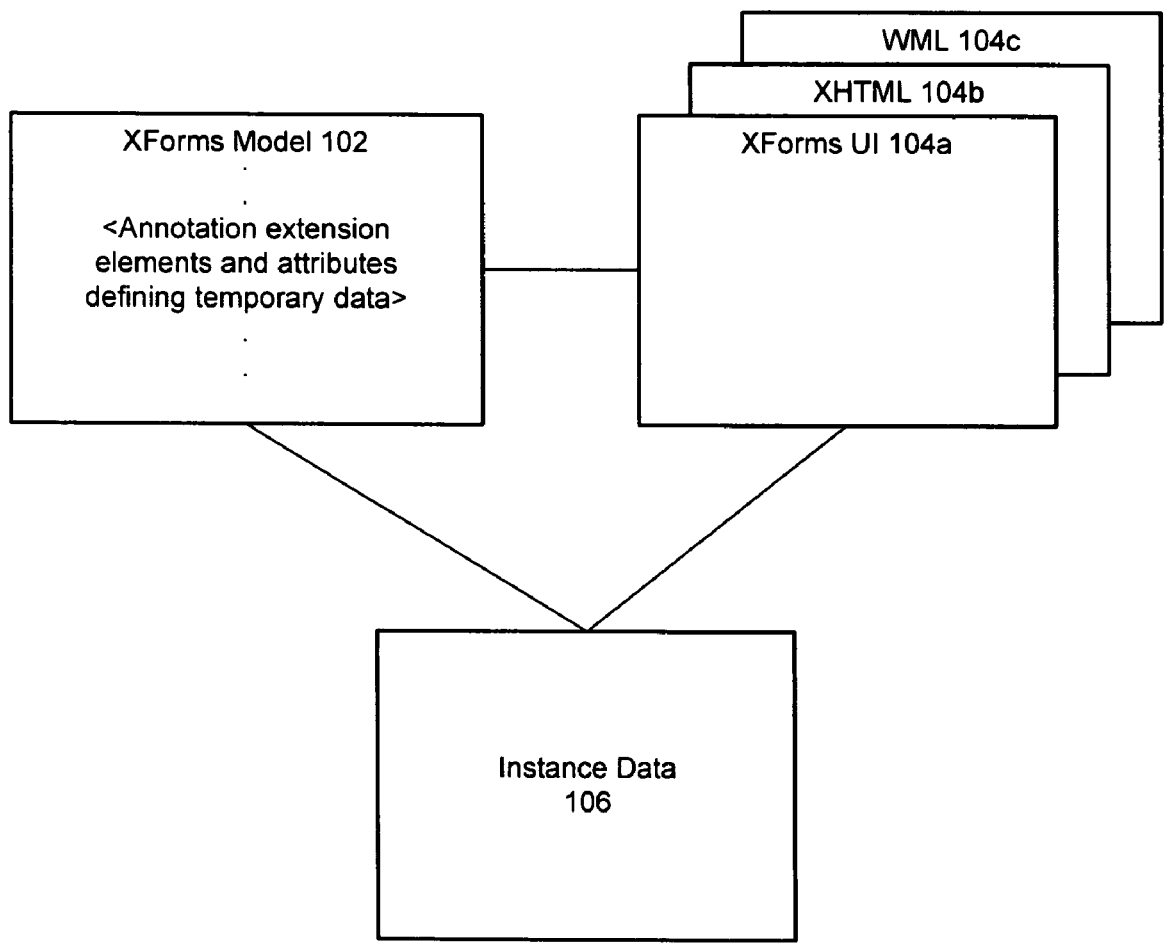
FIG. 1 depicts an XForms application environment, in accordance with an embodiment of the present invention.

FIG. 1 is a block diagram of an XForms environment, according to one embodiment of the invention. In FIG. 1, XForms model 102 is a definition of an XML form, as specified by the XForms specification. The XForms model defines constraints and other run-time aspects of XForms. For example, XForms model 102 describes the structure of instance data 106. Various presentation modules may be employed as user interfaces for the XForms model, such as XForms user interface 104a, XHTML 104b, WML 104c, etc. XForms user interface 104a provides a set of visual controls for replacing form controls such as those deployed with XHTML.

In an embodiment of the invention, an extension element is exposed within an XForms markup (e.g., XForms model 102 of FIG. 1), and describes element names and attributes of the desired temporary instance data, which can be read and written as normal XForms instance data.

In one implementation of this embodiment, an <annotate> element appears under an XForms <extension> element, and wraps a set of <addAttribute> and <addElement> elements. An <addAttribute> element or <addElement> attributes adds a new attribute or a new element, respectively, to the instance data nodeset specified in a corresponding XPath expression in the "nodeset" attribute of the <annotate> element.

The following XML schema is one example of how these <extension> elements may be employed in an XForms markup:

EXAMPLE 1

```
<xs:element name="annotate"
xml:namespace=
"http://www.oracle.com/2003/XClient/TemporaryVariable">
    <xs:complexType>
```

-continued

```
<xs:sequence>
    <xs:element name="addAttribute">
        <xs:complexType>
            <xs:attribute name="name" type="xs:string"/>
            <xs:attribute name="serialize" type="xs:string"/>
        <xs:complexType>
    </xs:element>
    <xs:element name="addElement">
        <xs:complexType>
            <xs:attribute name="name" type="xs:string"/>
            <xs:attribute name="serialize" type="xs:string"/>
        </xs:complexType>
    </xs:element>
</xs:sequence>
<xs:attribute name="nodeset"/>
    </xs:complexType>
</xs:element>
```

The extension element allows an XForms application developer to describe element names and attributes of the specified temporary instance data. In Example 1, the temporary instance data attributes and elements added with the annotation framework (i.e., addAttribute and addElement) may appear and behave as any other instance data attributes or elements. However, the attributes and elements may reside in the specified namespace (i.e., http://www.oracle.com/2003/XClient/TemporaryVariable) rather than the default namespace for instance data.

Temporary data may or may not be serialized when the XForms document does a submission, depending on whether it is to be exposed to an external XForms application data consumer. Default behavior may be to prevent serialization of temporary data elements and attributes.

One skilled in the art will appreciate that an embodiment of the invention may be deployed as an extension to the XForms specification, available at http://www.w3.org, and may therefore be useful with an XForms language processor or an XForms-enabled application.

An implementation of the invention is particularly suitable for wireless devices that are compatible with XForms. In this implementation, the invention is embodied in the wireless client as a set of additional element handlers within the XForms processor. This implementation requires no modification to any server-side components or existing XForms document instance data.

As one skilled in the art will appreciate, an XForms processor sees an XForms document and the corresponding instance data as a set of DOM (Document Object Model) trees. In particular, the XForms document and the instance document are treated as separate DOMs, even if the instance document is embedded in the source XForms document.

Figure 2:
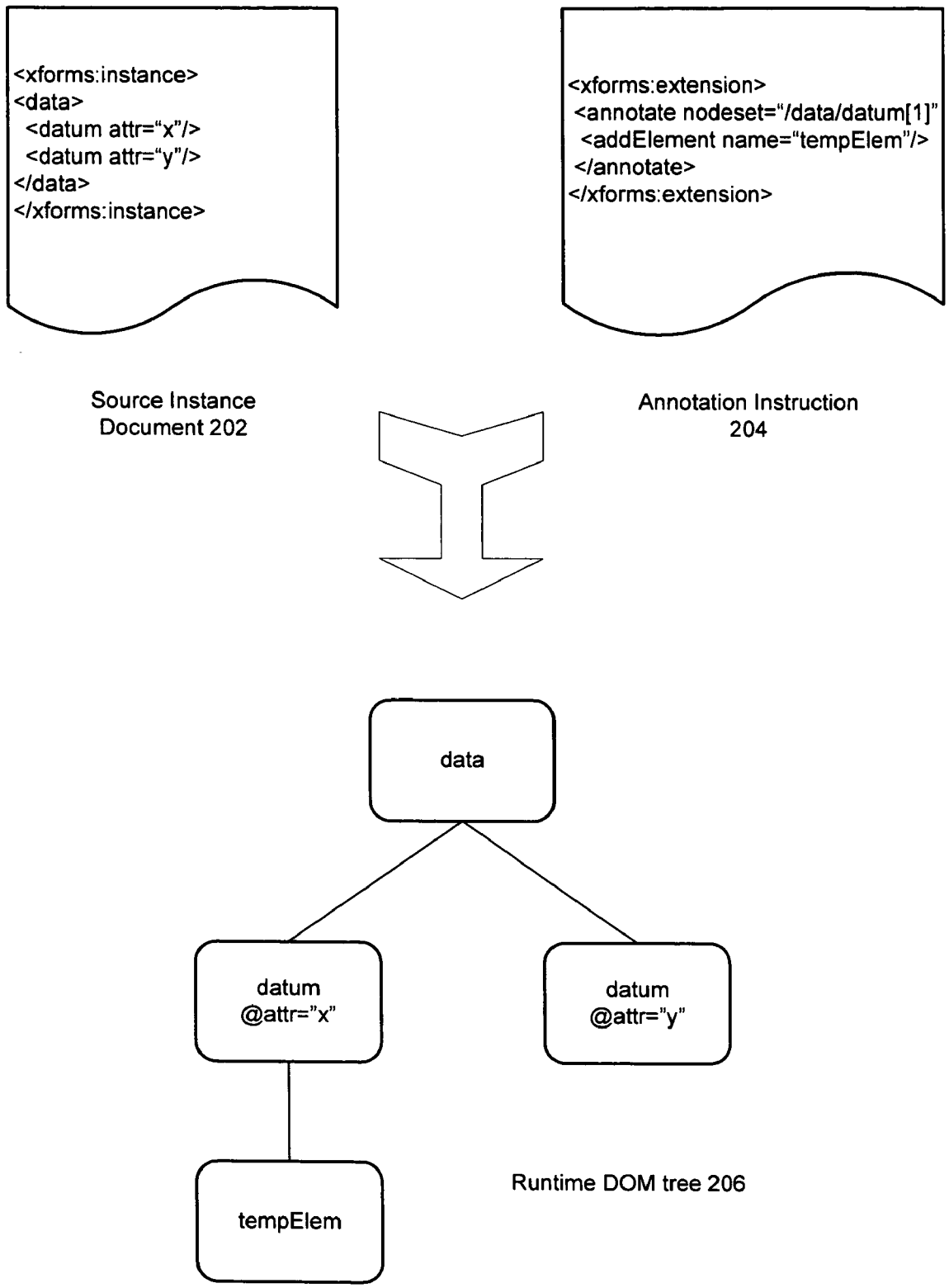
FIG. 2 depicts an illustrative runtime DOM (Document Object Modeling) tree formed from a source instance document and an annotation instruction, according to one embodiment of the invention.

FIG. 2 depicts an illustrative runtime DOM tree formed from a source instance document (comprising instance data) and an annotation instruction (comprising a novel extension element), according to one embodiment of the invention.

In FIG. 2, source instance document 202 comprises two datum entries, each with a single attribute. Annotation instruction 204 specifies that a temporary element (tempElem) is to be added to a nodeset comprising one node—the first datum node. Runtime DOM tree 206 depicts the result of annotation: two datum elements under the data node, with tempElem under the first datum element. Source instance document 202 may be provided by an external or third-party, or may be included in the XForms model document.

Figure 3:
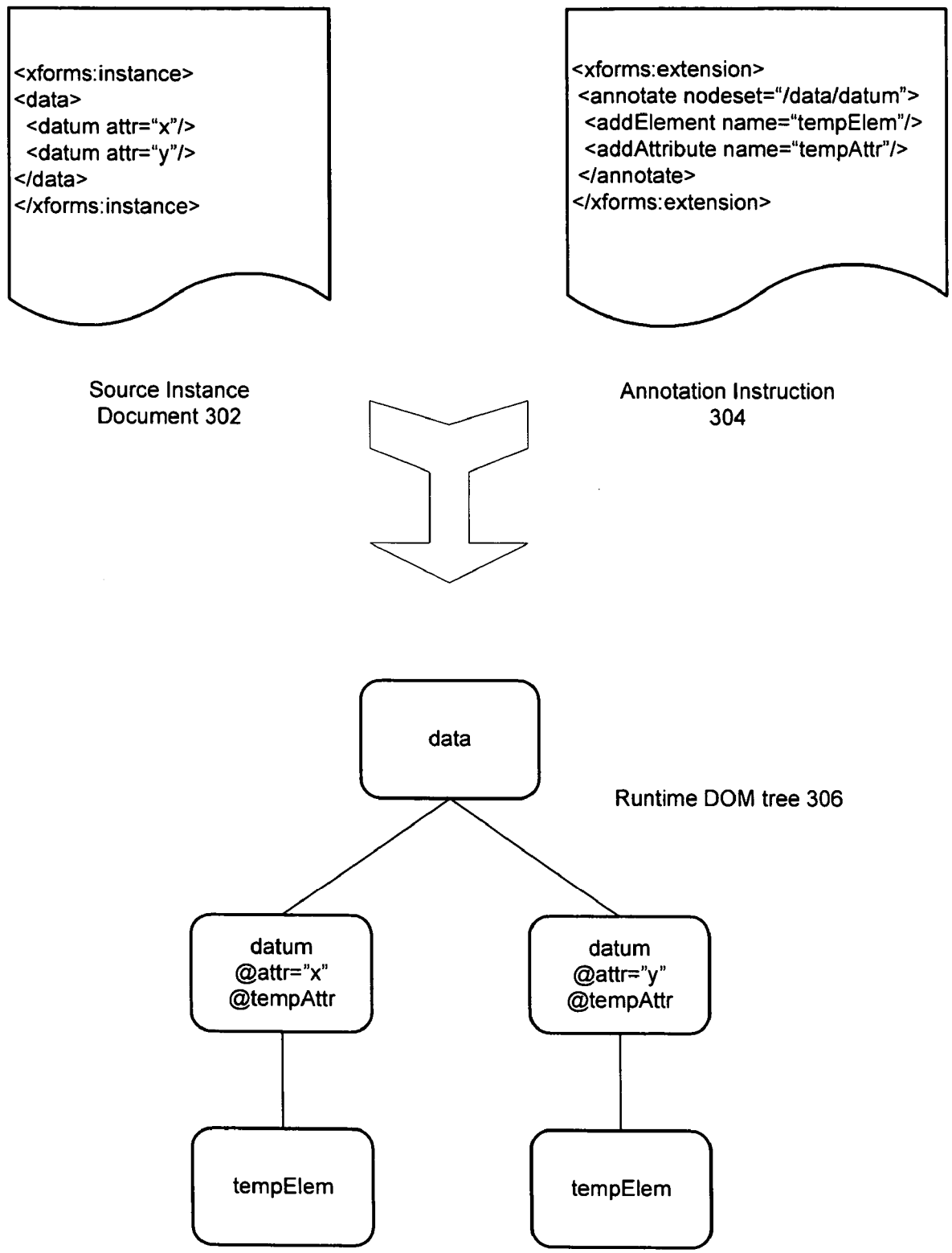
FIG. 3 depicts the annotation of a multi-node nodeset, according to one embodiment of the invention.

FIG. 3 depicts the annotation of a multi-node nodeset, according to one embodiment of the invention. Source instance document 302 mirrors document 202 of FIG. 2, while annotation instruction 304 includes an addAttribute tag to add a temporary attribute (tempAttr) to each node of the nodeset. Runtime DOM tree 306 demonstrates the result of annotation, with the temporary attribute and temporary element (tempElem) added to each datum node. Illustratively, if a datum node were cloned (e.g., using '<xforms:insert ref="data/datum"/>'), the cloned node would also include tempAttr and tempElem.

Figure 4:
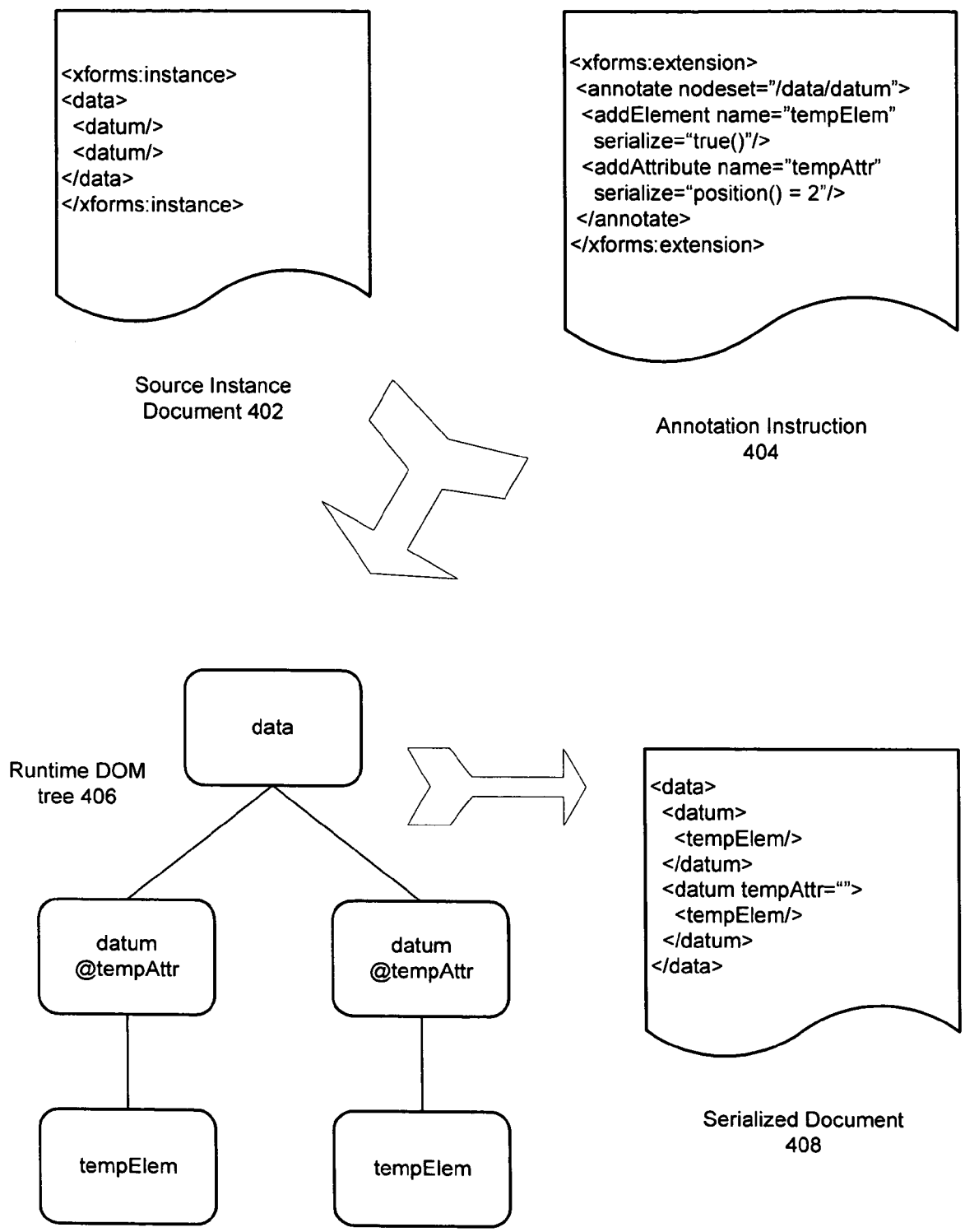
FIG. 4 depicts the annotation and submission of an XForms document, with conditional serialization, according to one embodiment of the invention.

FIG. 4 depicts the annotation and submission of an XForms document, with conditional serialization, according to one embodiment of the invention. Source instance document 402 includes two empty datum nodes, while annotation instruction 404 mirrors annotation instruction 304 of FIG. 3, but also includes serialize statements for tempElem and tempAttr. Runtime DOM tree 406 shows the resulting DOM tree, and serialized document 408 show the result of submission.

In this embodiment tempElem will be serialized, because of the statement 'serialize="true"'. The statement 'serialize="position( )=2"' stipulates that only the second tempAttr attribute will be serialized.

Figure 5:
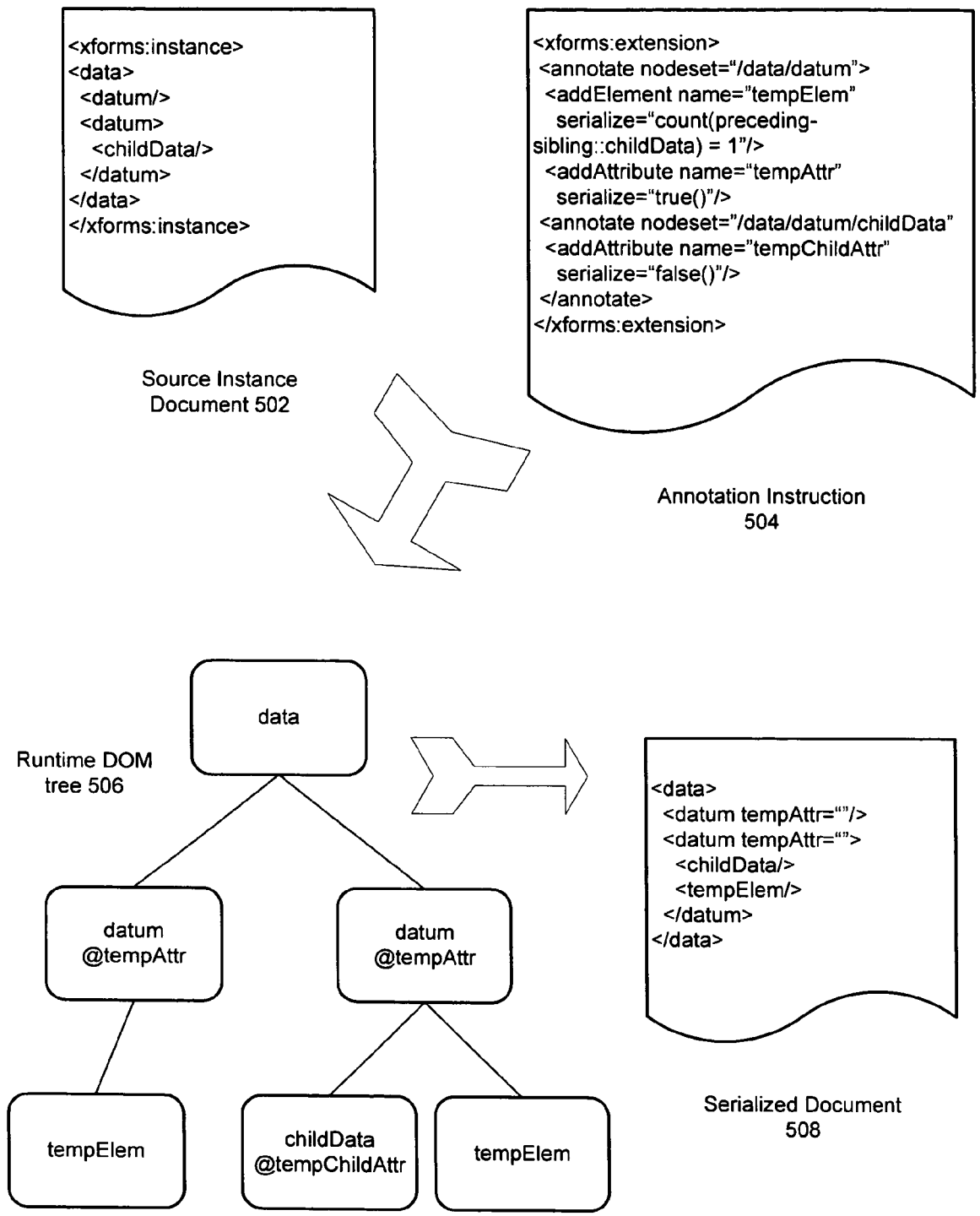
FIG. 5 demonstrates the use of an annotation extension to add elements and attributes, with conditional serialization, according to one embodiment of the invention.

FIG. 5 also demonstrates the use of the annotation extension to add elements and attributes, with conditional serialization, according to an embodiment of the invention. In FIG. 5, source instance document 502 includes two datum nodes, one of which includes a subnode. Annotation instruction 504 adds temporary elements and attributes, and specifies conditional serialization. Runtime DOM tree 506 demonstrates the DOM tree formed for the instance data as a result of annotation, while serialized document 508 shows the result of submission.

In this embodiment, the tempElem elements are conditionally serialized, depending on whether the specified XPath expression in the "serialize" attribute evaluates to true( ). The expression can be as simple or as complicated as the developer chooses. The tempAttr attributes are serialized, but the tempChildAttr attribute is not.

Another example of the use of temporary data storage is now described in conjunction with FIGS. 6-7. In the embodiment of the invention depicted in FIG. 6, temporary variables are employed to enable relevance toggling. Relevance toggling requires an attribute within the model of an XForms application, to allow one to specify whether certain user interface controls (within the presentation layer of the XForms application) should or should not be displayed, based on certain values or conditions within the instance data.

In this example, the XForms application comprises accounting or financial functionality (e.g., an expense report), and relevance toggling is used to toggle between summary and detailed views of receipts. The instance data, depicted in FIG. 7, are provided by an external source. Because that source is merely concerned with providing the expense data, it does not attempt to provide for various views of the data. By applying temporary variables through annotation instructions and enabling relevance toggling, we can allow one to view a summary of all expenses, or the details of a single expense.

FIGS. 6A-B present the entire XForms document 602, embedded within an XHTML document, which includes a reference to the location (expenseData.xml) of Instance Data Document 702 (FIG. 7) and annotation instructions, and defines a user interface button for toggling between the summary and detailed views of expenses.

The head portion of document 602 adds a temporary attribute "display," which will be used to indicate whether a detailed view (i.e., Long Description) or summary view (i.e., Short Description) of an expense should be presented. The <xforms:trigger> sections in the body of the document define a trigger for toggling between the views. The DOMActivate event reflects a user's activation of a user interface control.

Although embodiments of the invention have been described as adding specific tags to an XForms document model (e.g., <addElement>, <addAttribute>), the tags used to delineate temporary data may be different in other embodiments, and may be inserted in various locations of the document model.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable storage medium. Suitable computer-readable storage medium may include volatile RAM and/or non-volatile ROM, disk and memory.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A computer-implemented method of manipulating temporary data storage in an XForms application, the method comprising:

selecting, by using a computer, a set of XForms instance data to be consumed during execution of the XForms application;

in an XForms model document for the XForms application, defining temporary XForms data for use during the execution of the XForms application by:

inserting into an annotation instruction within the XForms model document a first tag that identifies a temporary XForms data element to be added to the XForms instance data for the execution of the XForms application;

inserting a serialization instruction into the XForms model document, for a first temporary data element, to indicate whether the first temporary data element is serialized during the execution of the XForms application;

inserting into the annotation instruction within the XForms model document a second tag that identifies a temporary attribute to be added to the XForms instance data for the execution of the XForms application; and processing the XForms model document with an XForms processor, wherein processing the XForms model document involves producing a runtime document object modeling tree with an additional node for each temporary data element, wherein the document object modeling tree models the XForms instance data.

2. The method of claim 1, wherein the serialization instruction is conditional, so that serialization of the first temporary data element depends on a state of the first temporary data element or the instance data during execution of the XForms application.

3. The method of claim 1, further comprising:
inserting a serialization instruction into the model document, for a first element of the instance data, to indicate whether the first element of the instance data should be serialized during execution of the XForms application.

4. The method of claim 3, wherein the serialization instruction is conditional, so that serialization of the first element of the instance data depends on a state of the first element of the instance data or a temporary data element during execution of the XForms application.

5. The method of claim 1, wherein the first tag is an <addElement> tag.

6. The method of claim 1, wherein the second tag is an <addAttribute> tag.

7. A computer readable storage medium storing instructions that, executed by a computer, cause the computer to perform a method of manipulating temporary data storage in an XForms application, the method comprising:
selecting a set of XForms instance data to be consumed during execution of the XForms application;
in an XForms model document for the XForms application, defining temporary XForms data for use during the execution of the XForms application by:
inserting into an annotation instruction within the XForms model document a first tag that identifies a temporary XForms data element to be added to the XForms instance data for the execution of the XForms application;
inserting a serialization instruction into the XForms model document, for a first temporary data element, to indicate whether the first temporary data element is serialized during the execution of the XForms application;
inserting into the annotation instruction within the XForms model document a second tag that identifies a temporary attribute to be added to the XForms instance data for the execution of the XForms application; and
processing the XForms model document with an XForms processor, wherein processing the XForms model document involves producing a runtime document object modeling tree with an additional node for each temporary data element, wherein the document object modeling tree models the XForms instance data.

8. The computer readable storage medium of claim 7, wherein the serialization instruction is conditional, so that serialization of the first temporary data element depends on a state of the first temporary data element or the instance data during the execution of the XForms application.

9. The computer readable storage medium of claim 7, wherein the method further comprises: inserting a serialization instruction into the model document, for a first element of the instance data, to indicate whether the first element of the instance data should be serialized during the execution of the XForms application.

10. The computer readable storage medium of claim 9, wherein the serialization instruction is conditional, so that serialization of the first element of the instance data depends on a state of the first element of the instance data or a temporary data element during the execution of the XForms application.

11. The computer readable storage medium of claim 7, wherein the first tag is an <add Element> tag.

12. The computer readable storage medium of claim 7, wherein the second tag is an <addAttribute> tag.

13. A computer system for manipulating temporary data storage in an XForms application, the computer system comprising:
a processor;
a memory;
a selecting mechanism for selecting a set of XForms instance data to be consumed during execution of an XForms application;
a defining mechanism for defining, in an XForms model document for the XForms application, temporary XForms data to use during the execution of the XForms application, wherein the defining mechanism comprises:
a first inserting mechanism for inserting into an annotation instruction within the XForms model document a first tag that identifies a temporary XForms data element to be added to the XForms instance data for the execution of the XForms application;
a second inserting mechanism for inserting into the annotation instruction within the XForms model document a second tag that identifies a temporary attribute to be added to the XForms instance data for the execution of the XForms application;
a third inserting mechanism for inserting a serialization instruction into the XForms model document, for a first temporary data element, to indicate whether the first temporary data element should be serialized during execution of the XForms application; and
a processing mechanism for processing the XForms model document with an XForms processor, wherein the processing the XForms model document involves producing a runtime document object modeling tree with an additional node for each temporary data element, wherein the document object modeling tree models the XForms instance data.

14. The computer system of claim 13, wherein the serialization instruction is conditional, so that serialization of the first temporary data element depends on a state of the first temporary data element or the instance data during execution of the XForms application.

15. The computer system of claim 13, further comprising:
a third inserting mechanism configured to insert a serialization instruction into the model document, for a first element of the instance data, to indicate whether the first element of the instance data should be serialized during execution of the XForms application.

16. The computer system of claim 15, wherein the serialization instruction is conditional, so that serialization of the first element of the instance data depends on a state of the first element of the instance data or a temporary data element during execution of the XForms application.

17. The computer system of claim 13, wherein the first tag is an <addElement> tag and the second tag is an <addAttribute> tag.

* * * * *

UNITED STATES PATENT AND TRADEMARK OFFICE
CERTIFICATE OF CORRECTION

PATENT NO. : 7,526,491 B2  Page 1 of 1
APPLICATION NO. : 10/899573
DATED : April 28, 2009
INVENTOR(S) : Bass et al.

It is certified that error appears in the above-identified patent and that said Letters Patent is hereby corrected as shown below:

In column 8, line 2, in claim 11, delete "<add Element>" and insert -- <addElement> --, therefor.

Signed and Sealed this

Twenty-fifth Day of May, 2010

David J. Kappos
*Director of the United States Patent and Trademark Office*